P. TYSSELING.
SPRING TIRE.
APPLICATION FILED OCT. 9, 1911.
1,048,238.
Patented Dec. 24, 1912.
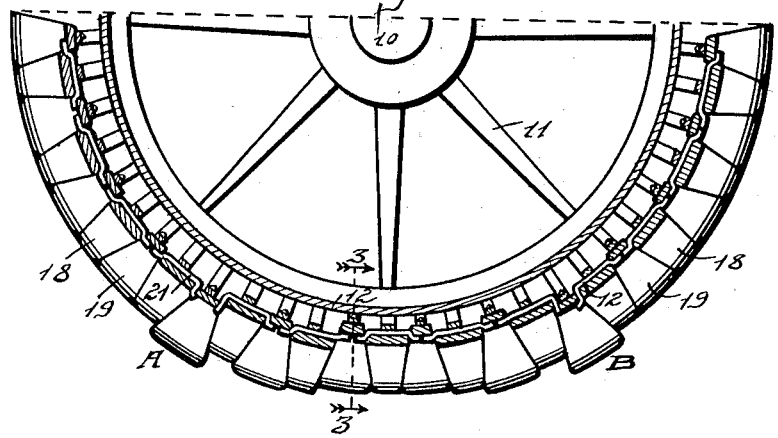
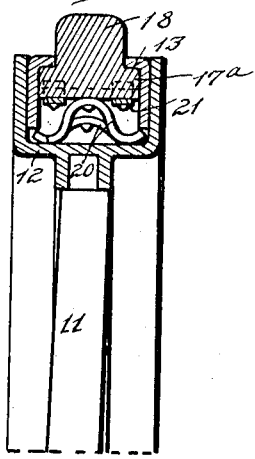
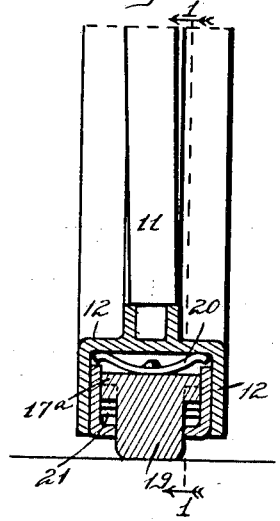
Witnesses:
Inventor:
Peter Tysseling

UNITED STATES PATENT OFFICE.

PETER TYSSELING, OF PELLA, IOWA.

SPRING-TIRE.

1,048,238. Specification of Letters Patent. Patented Dec. 24, 1912.

Application filed October 9, 1911. Serial No. 653,604.

*To all whom it may concern:*

Be it known that I, PETER TYSSELING, a citizen of the United States, residing at Pella, in the county of Marion and State of Iowa, have invented a certain new and useful Spring-Tire, of which the following is a specification.

The object of my invention is to provide a spring tire whereby the ordinary pneumatic feature is dispensed with and at the same time a cushioning effect is produced.

A further object is to provide such a tire so constructed that the friction of the road is borne by a hard surface not easily worn.

A further object is to provide a tire so constructed in which all the blocks are yieldingly supported on the rim of the wheel so that when the blocks strike the surface of the ground, as the wheel rotates, they will be forced inwardly, thus forcing other blocks outwardly.

In other words it is an object of my invention to mount the blocks which have their broad bases outwardly, in such a manner that they may be forced outwardly for a short distance, thus leaving a space which would make it possible for other of the blocks to be moved inwardly.

In general it is my purpose to provide a tire composed of blocks yieldingly mounted on the rim of a wheel, which blocks are in the shape of a truncated wedge and are so mounted that they may alternately move either inwardly or outwardly with relation to the adjacent block so that a space is left to permit the blocks which rest on the ground to move inwardly against yielding pressure.

My invention consists in certain details, in the construction, arrangement, and combination of the various parts of the device, whereby the objects contemplated are attained, as hereinafter more fully set forth, pointed out in my claims and illustrated in the accompanying drawings, in which:

Figure 1 shows a vertical, transverse, sectional view through a portion of a wheel equipped with a tire embodying my invention taken on the line 1—1 of Fig. 2. Fig. 2 shows a vertical, transverse, sectional view taken on the line 3—3 of Fig. 1. Fig. 3 shows a vertical, sectional view through the tire rim and one of the blocks.

In the accompanying drawings, I have used the reference numeral 10 to indicate the hub of the wheel which may be of any ordinary construction. Extending from the hub, are spokes 11, which are mounted in a rim 12 which has the form of a channel having flanges extending outwardly from the wheel. Secured to the inner side of each flange of the channel 12 are angle bars 13, the angles of which extend toward each other from the outer edges of the channel 12, as clearly shown in Figs. 2 and 3.

Mounted between the angle bars 13 are blocks 18 and 19 having the shape of a truncated wedge, as shown in Fig. 1. The blocks 18 have their narrow bases outward and the blocks 19 have their broad bases outward. The blocks 19 are deeper than the blocks 18. The blocks 18 and 19 are provided with flanges $17^a$ designed to rest between the angle bars 13. The inwardly extending flanges of the angle bars 13 limit the outward movement of the wedge shaped blocks for the reason that the flanges $17^a$ engage the opposite inwardly extending flanges of the angle bars 13. The blocks 18 are mounted on leaf springs 20, the ends of which rest on the bottoms of the channel bar 12. The springs 20 normally hold the blocks 18 at the outward limit of their movement. The blocks 19 are mounted on leaf springs 21 which normally hold the blocks 19 in position with their flanges $17^a$ slightly spaced apart from the outer flanges of the angle bars 13. Attached to the sides of the blocks 18 are approximately flat springs 21, the ends of which rest on the outer surfaces of the flanges of the adjacent blocks 19. It will thus be seen that the blocks 19 are mounted in such a position that they are capable of both inward and outward movement in relation to the rim of the wheel. It will be seen that my channel shaped rim may be mounted on an ordinary wheel without difficulty.

In practical operation, my improved spring tire works as follows: When the wheels rotate, the weight of the vehicle will force the few blocks 18 and 19, which are in contact with the surface of the ground, inwardly, thus giving some space around the circumference of the rim and permitting some of the blocks 19 which are not in engagement with the surface of the ground, to move outwardly as shown at A and B in Fig. 1. When the blocks 19, just referred to are forced outwardly, the blocks 18 and 19 resting upon the surface of the ground will be permitted to move inwardly, thus giving the effect of a cushion tire.

My improved spring tire has the advantage of being puncture proof and doing away with the wear and deterioration to which rubber tires are subject while at the same time the cushioning effect is retained. My blocks may be made of wood or other suitable material, and present a hard durable surface to the road. The parts of my device may be easily replaced at a comparatively small expense. If the outer ends of the blocks 18 and 19 should be worn off, said blocks may be easily and cheaply replaced.

It will readily be seen that numerous variations may be made in detail of construction of my device, without departure from its principal purpose which is to provide a tire made of wedge shaped blocks yieldingly mounted in such a way that some of the blocks are moved slightly out of the circle of blocks as the wheel rotates so as to leave a space between the blocks so moved and the adjacent blocks and to permit the blocks which are in contact with the surface of the road to move inwardly against spring pressure.

I claim as my invention:

1. In a device of the class described, a wheel, a channel shaped rim thereon, a series of truncated wedge shaped blocks mounted in said rim, with their broad and narrow faces alternately outward, and capable of radial movement with relation to the wheel, means for limiting the outward movement of said blocks, yielding means for holding the blocks having their narrow edges outward, at the outward limit of their movement, yielding means for holding the blocks having their broad bases outward at points between the limits of their movement.

2. In a device of the class described, a wheel, a channel shaped rim thereon, a series of truncated wedge shaped blocks mounted in said rim, with their broad and narrow faces alternately outward, and capable of radial movement with relation to the wheel, means for limiting the outward movement of said blocks, yielding means for holding the blocks having their narrow edges outward, at the outward limit of their movement, yielding means tending to hold the blocks having their broad bases outward, at the outward limit of their movement. yielding means connecting the blocks having their broad bases outward, with the blocks having their narrow edges outward, and of sufficient strength to hold the blocks having their broad bases outward at points between the respective limits of their movement.

Des Moines, Iowa, Sept. 16, 1911.

PETER TYSSELING.

Witnesses:
   Geo. G. Gaass,
   P. H. Stubenranch.

---

Copies of this patent may be obtained for five cents each, by addressing the "Commissioner of Patents, Washington, D. C."